US012775527B2

(12) United States Patent
Manchale Sridhar et al.

(10) Patent No.: US 12,775,527 B2
(45) **Date of Patent: *Oct. 27, 2026**

(54) REDO AVOIDANCE DURING DATABASE RECOVERY

(71) Applicant: Salesforce, Inc., San Francisco, CA (US)

(72) Inventors: Akshay Manchale Sridhar, San Francisco, CA (US); Matthew Woicik, Bellevue, CA (US); James E. Mace, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/065,727

(22) Filed: Feb. 27, 2025

(65) Prior Publication Data

US 2025/0199919 A1 Jun. 19, 2025

Related U.S. Application Data

(63) Continuation of application No. 18/162,342, filed on Jan. 31, 2023, now Pat. No. 12,253,916.

(51) Int. Cl.
*G06F 7/00* (2006.01)
*G06F 11/1446* (2026.01)
(Continued)

(52) U.S. Cl.
CPC ...... *G06F 11/1469* (2013.01); *G06F 16/2358* (2019.01); *G06F 16/2379* (2019.01); *G06F 2201/84* (2013.01)

(58) Field of Classification Search
USPC .................................. 707/640–680, 610–704
See application file for complete search history.

(56) References Cited

U.S. PATENT DOCUMENTS 7,725,470 B2 5/2010 Richards
7,733,910 B2 6/2010 Mace
(Continued)

FOREIGN PATENT DOCUMENTS

WO 2008021748 A3 9/2008

*Primary Examiner* — Tuan A Pham
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to a database recovery routine to start up a database system in response to a database failure. The database system accesses checkpoint information identifying a set of active database transactions that were active at a flush point that occurred before the database failure. As a part of the database recovery routine, the database system replays database transactions that occurred between a recovery point and the flush point. The database transactions include the set of active database transactions but exclude any committed or aborted database transactions that occurred between the recovery point and the flush point such that less than a total number of database transactions occurring between the recovery point and the flush point are replayed. The database system further replays, without excluding committed or aborted database transactions, database transactions occurring between the flush point and a recovery end point at which the database failure occurred.

20 Claims, 7 Drawing Sheets

(51) Int. Cl.
*G06F 16/23* (2019.01)
*G06F 17/00* (2019.01)

(56) References Cited

U.S. PATENT DOCUMENTS

| | | | | |
|---|---|---|---|---|
| 9,015,197 | B2 | 4/2015 | Richards | |
| 9,208,031 | B2 | 12/2015 | Mace | |
| 10,740,320 | B2 | 8/2020 | Mace | |
| 11,106,503 | B2 | 8/2021 | Manchale Sridhar | |
| 11,386,065 | B2 | 7/2022 | Fanghaenel | |
| 11,416,470 | B2 | 8/2022 | Chatterjee | |
| 11,544,271 | B2 | 1/2023 | Helland | |
| 2008/0033964 | A1 | 2/2008 | Richards | |
| 2011/0161723 | A1 | 6/2011 | Taleck | |
| 2018/0217987 | A1 | 8/2018 | Helland | |
| 2018/0218022 | A1 | 8/2018 | Mace | |
| 2020/0174796 | A1 | 6/2020 | Swanson | |
| 2022/0138175 | A1 | 5/2022 | Mahendra Kumar | |
| 2022/0164335 | A1* | 5/2022 | Abouzour | G06F 16/2379 |
| 2022/0382650 | A1* | 12/2022 | Schreter | G06F 11/1469 |
| 2022/0382651 | A1* | 12/2022 | Lu | G06F 11/1471 |

* cited by examiner

REDO AVOIDANCE DURING DATABASE RECOVERY

PRIORITY CLAIM

The present application is a continuation of U.S. application Ser. No. 18/162,342, entitled "REDO AVOIDANCE DURING DATABASE RECOVERY," filed Jan. 31, 2023, the disclosure of which is incorporated by reference herein in its entirety.

BACKGROUND

Technical Field

This disclosure relates generally to computer systems and, more specifically, to various mechanisms for replaying a reduced set of database transactions during a database recovery.

Description of the Related Art

Enterprises routinely implement database management systems (or, simply "database systems") that enable users to store a collection of information in an organized manner that can be efficiently accessed and manipulated. In various cases, a database system implements a log-structured merge tree (LSM tree) having multiple levels that each store data in records as key-value pairs. The database system can include a persistent storage that houses the LSM tree and a database node having a local in-memory cache. During operation, the database node initially writes records into its in-memory cache before later flushing them to the persistent storage. As a part of flushing records, the database node writes the records into new files that are stored in one of the multiple levels of the LSM tree. Over time, those records are rewritten into new files stored in lower levels as the records are merged down the LSM tree.

DETAILED DESCRIPTION

Figure 1:
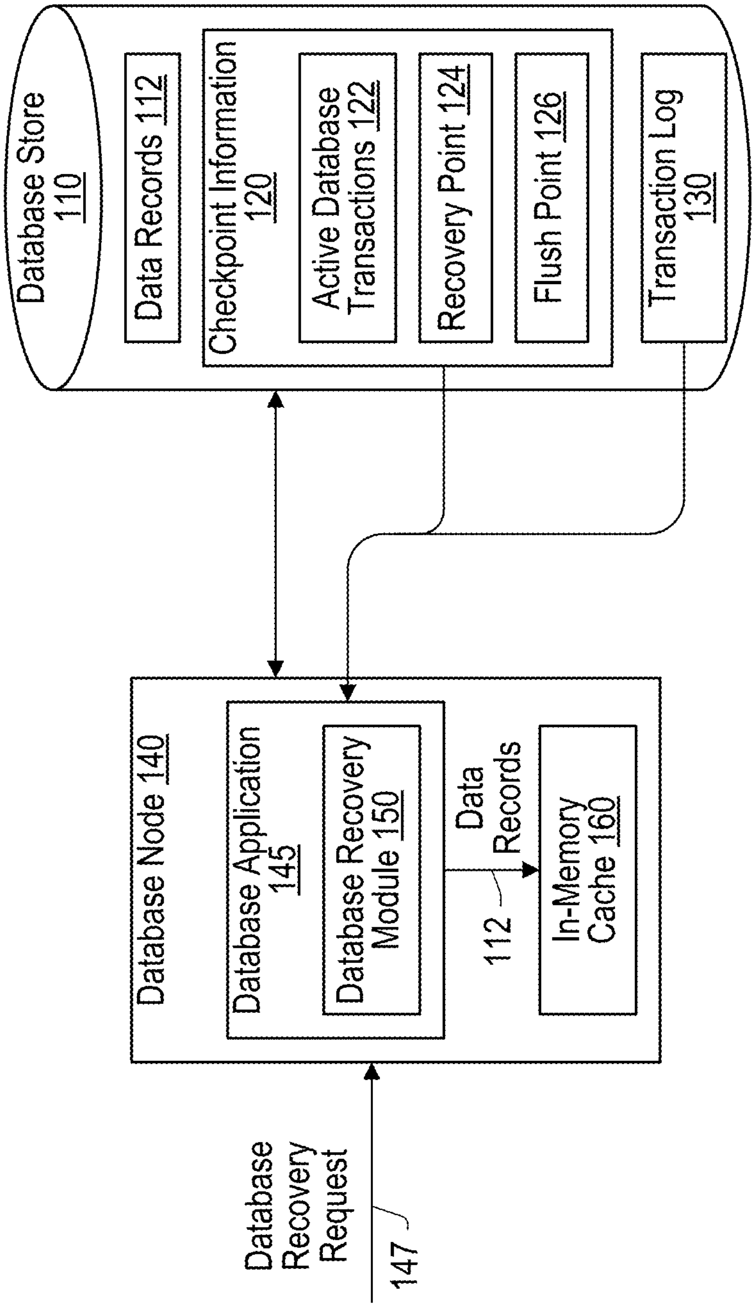
FIG. 1 is a block diagram that illustrates example elements of a system having a database node and a database store that stores checkpoint information, according to some embodiments.

When performing a database transaction, in some cases, a database node of a database system inserts data records into a local in-memory cache and separately stores log records that describe the database operations performed by that database node. For example, if the database node executes a SQL INSERT statement, then it inserts the specified data record(s) into the in-memory cache and stores, as a part of a transaction log, a log record that identifies the execution of that SQL INSERT statement. A transaction can be aborted or committed. If the transaction is aborted, then the database node rolls back the transaction, removes the data records from the in-memory cache, and stores a log record about the aborted transaction. But if that transaction is committed, then its data records are permitted to be flushed by the database node to persistent storage—the database node may periodically perform the flush or in response to certain events (e.g., the in-memory cache is full or close to becoming full). As used herein, the term "commit" in the context of a database transaction is used in accordance with its well-understood meaning and refers to the process of causing changes made during the transaction to be saved and made visible outside of the entity performing the transaction.

A database node can crash and be restarted as a part of a database recovery process. As a part of the recovery process, the database node rebuilds its local in-memory cache to the state that existed when the crash occurred. In many cases, the database node reperforms the database operations of the log records of the transaction log (referred to as "replaying the log records of the transaction log") beginning from a recovery point that corresponds to the oldest transaction that was not recorded as being committed or aborted. Between that recovery point and the end of the transaction log, there can be many log records associated with database transactions that were aborted or committed and flushed. Replaying the log records of these transactions waste time and computing resources. For example, replaying the log records of an aborted transaction involves the database node writing the data records into the in-memory cache, determining that the transaction was actually aborted, and then removing those data records from the in-memory cache. In the case of a transaction that was committed and flushed, its data records are already present in persistent storage and therefore replaying that committed transaction so that its data records can be flushed again is purposeless. This disclosure addresses, among other things, the technical problem of how to avoid replaying particular database transactions during a database recovery process.

In various embodiments described below, a system comprises a database and a database node that executes database transactions that can involve reading and writing data records with respect to the database. During operation, the database node may write data records into a local in-memory cache and periodically perform a flush operation to flush records from the cache to the database. As a part of the flush operation, in various embodiments, the database node stores checkpoint information that identifies the database transactions that are active at the point when the flush operation occurs—referred to as the "flush" point. These active database transactions correspond to database transactions that have not committed or aborted. In some embodiments, the checkpoint information also identifies, with respect to a transaction log, the flush point and a recovery point at which to start a database recovery routine that can be performed in the event of a database failure.

During its operation, the database node may suffer a database failure (e.g., a crash). In response, the database node may be restarted and perform a database recovery routine as a part of the startup process. Consequently, in various embodiments, the database node accesses the checkpoint information and a portion of the transaction log stored at the database. The database node then replays the log records of database transactions that occurred between the recovery point and the flush point. Those database transactions include the active database transactions (which are identified by the accessed checkpoint information) but exclude any committed or aborted database transactions that occurred between the recovery point and the flush point such that less than a total number of database transactions occurring between the recovery point and the flush point are replayed. The database node may then replay, without excluding committed or aborted database transactions, database transactions occurring between the flush point and a recovery end point at which the database failure occurred. Thereafter, the database node may resume normal operation.

These techniques may be advantageous over prior approaches as these techniques may reduce the number of database transactions that have to be replayed during a database recovery routine. In particular, committed or aborted transactions may make up the majority of database transactions that occur between the recovery point and the flush point. By tracking the database transactions that are active at the flush point, a database node may skip replaying the committed or aborted transactions between those two points during the database recovery routine and thus not have to replay a majority of the database transactions. Accordingly, the database node may be started up more quickly in the event of a database failure. Furthermore, computing resources may be saved or reallocated for other uses. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. Within the illustrated embodiment, system 100 includes a database store 110 and a database node 140 having a database application 145 and an in-memory cache 160. Also as shown, database store 110 includes data records 112, checkpoint information 120 (including active database transactions 122, a recovery point 124, and a flush point 126), and a transaction log 130. As further shown, database application 145 includes a database recovery module 150. The illustrated embodiment may be implemented differently than shown. For example, system 100 might include a metadata repository that serves as a catalog that enables access to the data of database store 110.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, stores, and other entities that are associated with system 100. In various embodiments, system 100 is implemented using a cloud infrastructure that is provided by a cloud provider. Thus, database store 110 and database node 140 may utilize the available cloud resources of that cloud infrastructure (e.g., computing resources, storage resources, etc.) in order to facilitate their operation. As an example, software for implementing database node 140 might be stored on a non-transitory computer-readable medium of server-based hardware included in a datacenter of the cloud provider and executed in a virtual machine hosted on that server-based hardware. In some cases, database node 140 is implemented without the assistance of a virtual machine or other deployment technologies, such as containerization. In some embodiments, system 100 is implemented utilizing local or private infrastructure as opposed to a public cloud.

Database store 110, in various embodiments, includes a collection of information that is organized in a manner that allows for access, storage, and manipulation of that information. Database store 110 may include supporting software (e.g., storage nodes) that enables database node 140 to carry out those operations (e.g., accessing, storing, etc.) on the information that is stored at database store 110. In various embodiments, database store 110 is implemented using a single or multiple storage devices that are connected together on a network (e.g., a storage attached network (SAN)) and configured to redundantly store information in order to prevent data loss. The storage devices may store data persistently and therefore database store 110 may serve as a persistent storage for system 100. In various embodiments, data written to database store 110 by database node 140 is accessible to other database nodes 140 within a multi-node configuration (e.g., a database node cluster or a system having multiple database node clusters spread across different zones provided by a cloud provider).

In various embodiments, database store 110 stores two main types of files (also herein referred to as "extents"): a data file and a log file. A data file may comprise the actual data and may be append-only such that new data records 112 are appended to the data file until its size reaches a threshold and another data file is created. A data record 112, in various embodiments, comprises data and a database key that is usable to look up that data record 112. For example, a data record 112 may correspond to a row in a database table where the record specifies values for attributes of the database table. A log file may comprise log records that describe database operations (e.g., record insertions) performed as a result of executing database transactions. As with data files, a log file may be append-only and continuously receive appends as transactions do work. In various embodiments, transaction log 130 is a set of log files having log records that collectively identify a state of the database system implemented by system 100. As such, by reading transaction log 130, database node 140 can determine an ordering in which database operations were performed, including an ordering in which transactions were committed within system 100. Data files and log files, in various embodiments, are associated with file identifiers that can be used to locate them. Consequently, database node 140 may access data records 112 and log records from database store 110 by issuing access requests that include file identifiers to the storage nodes that implement database store 110.

While not shown, in some embodiments, system 100 includes a storage catalog having information about transaction log 130, such as the locations of log files. Thus, when database node 140 produces a log file, it may store information in the storage catalog that identifies the location of that log file. In various cases, database node 140 stores that information after it has finished appending log records to the log file. When implementing a database recovery routine, database node 140 may utilize the storage catalog to access checkpoint information 120 and/or transaction log 130. In some embodiments, the storage catalog is used to house a portion or all of checkpoint information 120 instead of database store 110.

Checkpoint information 120, in various embodiments, is information that facilitates the database recovery of database node 140. As described in greater detail with respect to FIG.

2B, checkpoint information 120 may be written when database node 140 performs a flush operation to flush committed records 112 from in-memory cache 160 to database store 110. As depicted, checkpoint information 120 specifies active database transactions 122, recovery point 124, and flush point 126. In various embodiments, active database transactions 122 correspond to those database transactions that are still being executed when the flush operation occurred. Recovery point 124, in various embodiments, corresponds to a position in transaction log 130 from which database node 140 should start reading log records as part of a database recovery routine, and flush point 126 corresponds to a position in transaction log 130 that is associated with a flush operation. Examples of the information stored in checkpoint information 120 are discussed in greater detail with respect to FIG. 3.

Database node 140, in various embodiments, facilitates database services, such as data retrieval, data manipulation, and data storage. In various embodiments, database node 140 is software that is executable on hardware, while in some embodiments, it encompasses both the hardware and the software. The database services may be provided to components internal and external to system 100. For example, database node 140 may receive a transaction request from an application node to process a database transaction. A database transaction is a logical unit of work (e.g., a set of database statements) to be performed in relation to data of database store 110. As an example, processing a database transaction may include executing a SQL SELECT statement to select one or more rows of a database table. The contents of a row may be specified in a data record 112 and thus database node 140 may return one or more requested data records 112 that correspond to those one or more rows. Performing a database transaction can include writing data records 112 to database store 110 as well.

Database application 145, in various embodiments, is executable software that provides the database services of database node 140. Accordingly, database application 145 may process database transactions to read records from and write records to database store 110. Data records 112 may be stored as a part of an LSM tree and thus database application 145 may manage the LSM tree, including maintaining metadata that describes the structural layout of the LSM tree, such as where files are stored within database store 110 and what data records 112 are included in those files. When executing a database transaction that involves writing data records 112, in various embodiments, database node 140 initially writes those data records 112 to in-memory cache 160 before flushing them to database store 110 after they have been committed.

In-memory cache 160, in various embodiments, is a buffer that stores data in memory (e.g., random access memory) of database node 140. HBase™ memstore is one example of in-memory cache 160. As mentioned above, database application 145 initially writes data records 112 into in-memory cache 160. As in-memory cache 160 becomes full and/or at certain points in time, database application 145 performs a flush operation in which committed data records 112 are flushed from in-memory cache 160 to database store 110. As a part of flushing the data records 112, in various embodiments, database application 145 writes them to new files at the top level of the LSM tree at database store 110. Data records 112 of database transactions that have not aborted or committed may remain stored in in-memory cache 160 even after the flush operation.

During its operation, database node 140 may suffer a database failure such that database node 140 has to be restarted or a new instance of database node 140 has to be deployed (using the same or similar hardware). In response to a database failure occurring or a problem detected by an administer, database node 140 can receive a database recovery request 147 to restart (if database node 140 has not crashed as a result of the database failure). In some cases, a primary database node 140 may crash and thus a standby database node 140 may be restarted to become the primary node. When database node 140 is starting up to recover, in various embodiments, database recovery module 150 performs a database recovery routine.

Database recovery module 150, in various embodiments, is software that is executable to recover database node 140 to the state that existed before the database failure. In order to do so, database recovery module 150 assists database application 145 in replaying a particular set of database transactions. In particular, in various embodiments, database recovery module 150 accesses checkpoint information 120 and one or more log files of transaction log 130. Database recovery module 150 may then cause database application 145 to replay certain log records of transaction log 130, from recovery point 124 to flush point 126, that are associated with active database transactions 122. In various embodiments, log records associated with committed or aborted transactions that are between recovery point 124 and flush point 126 are skipped. Once flush point 126 is reached, database recovery module 150 may then cause database application 145 to replay all log records of transaction log 130 occurring between flush point 126 and the end of transaction log 130. Replaying log records can include inserting data records 112 into in-memory cache 160 so that the state of in-memory cache 160 that existed when the database failure occurred is recreated. After implementing the database recovery routine, database node 140 may then resume accepting requests to perform new database transactions.

Figure 2A:
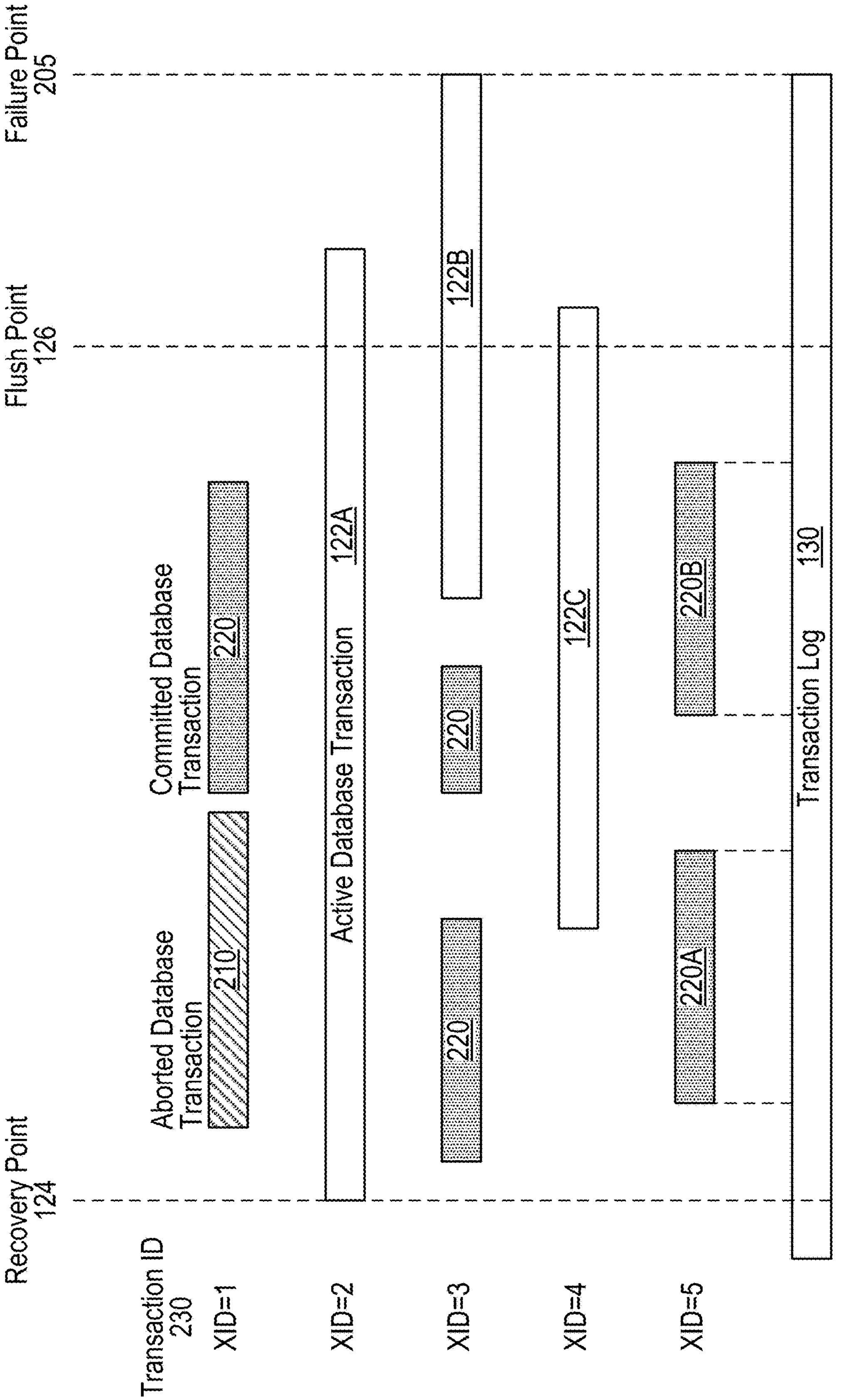
FIG. 2A is a block diagram that illustrates an example recovery point and flush point in relation to a set of database transactions, according to some embodiments.

Turning now to FIG. 2A, a block diagram of a recovery point 124 and a flush point 126 in relation to a set of database transactions is shown. Within the illustrated embodiment, there is an aborted database transaction 210, various committed database transactions 220, and active database transactions 122A-C. As further shown, there is transaction log 130. In the illustrated embodiment, time flows from the left side of the diagram to the right side of the diagram. For example, the start of active database transaction 122A occurs before the start of active database transaction 122B. The illustrated embodiment might be implemented differently than shown—e.g., each database transaction may have a unique transaction ID 230.

Recovery point 124, in various embodiments, identifies the initial log record written to transaction log 130 for the oldest active database transaction 122 at the time when the last flush operation was performed. In particular, when a flush operation is performed by database node 140, the data records 112 that belong to committed database transactions 220 (that committed since the last flush operation) are flushed from in-memory cache 160 to database store 110, in various embodiments. As an example, committed database transaction 220B might have been committed between the last flush operation and the flush operation corresponding to flush point 126, and thus the data records 112 written for the transaction are flushed. The data records 112 of active database transactions 122A-C, however, remain in in-memory cache 160 until those transactions are committed and a subsequent flush operation occurs (or those transactions are aborted). While active database transaction 122A commits after flush point 126, another flush operation does not occur before the database failure that corresponds to failure point 205 in the illustrated embodiment. Because a subsequent flush operation does not occur, active database transactions 122A's committed data records 112 are not flushed and thus are not persisted. As a result, in various embodiments, active database transaction 122A has to be replayed in order to ensure that its data records 112 are persisted. Accordingly, recovery point 124 identifies the initial log record written for active database transaction 122A because it is not persisted and is the oldest active database transaction 122 at flush point 126. Database node 140 may determine that active database transaction 122A is the oldest active database transaction 122 by observing transaction headers and identifying that active database transaction 122A wrote the earliest log record or based on another metric, such as a time stamp.

Flush point 126, in various embodiments, identifies a log record of transaction log 130 that corresponds to the most recent flush operation. In other embodiments, flush point 126 may correspond to the last log record written to transaction log 130 for the most recently committed database transaction 220 (or aborted database transaction 210) or a log record between that last log record and a log record associated with the most recent flush operation. For example, flush point 126 may identify the last log record written for committed database transaction 220B as it is the closest database transaction to flush point 126 that does not need to be replayed in the illustrated embodiment.

A transaction identifier 230, in various embodiments, is an identifier that is assigned to a database transaction during its execution. In some embodiments, the same transaction ID 230 can be used for multiple database transactions that do not overlap in execution. As shown, for example, committed database transactions 220A and 220B are both assigned a transaction ID "5" but do not overlap in execution. Once committed database transaction 220A commits, the transaction ID "5" can be reclaimed and then assigned to committed database transaction 220B during its execution. In various embodiments, when a given log record is written to transaction log 130, it may be stamped with the transaction ID 230 of the database transaction that caused it to be written. As discussed in greater detail with respect to FIG. 3, a transaction ID 230 used in conjunction with other information can be used to identify a starting log record of an active database transaction 122. In some embodiments, each database transaction is assigned a unique transaction ID 230.

Figure 2B:
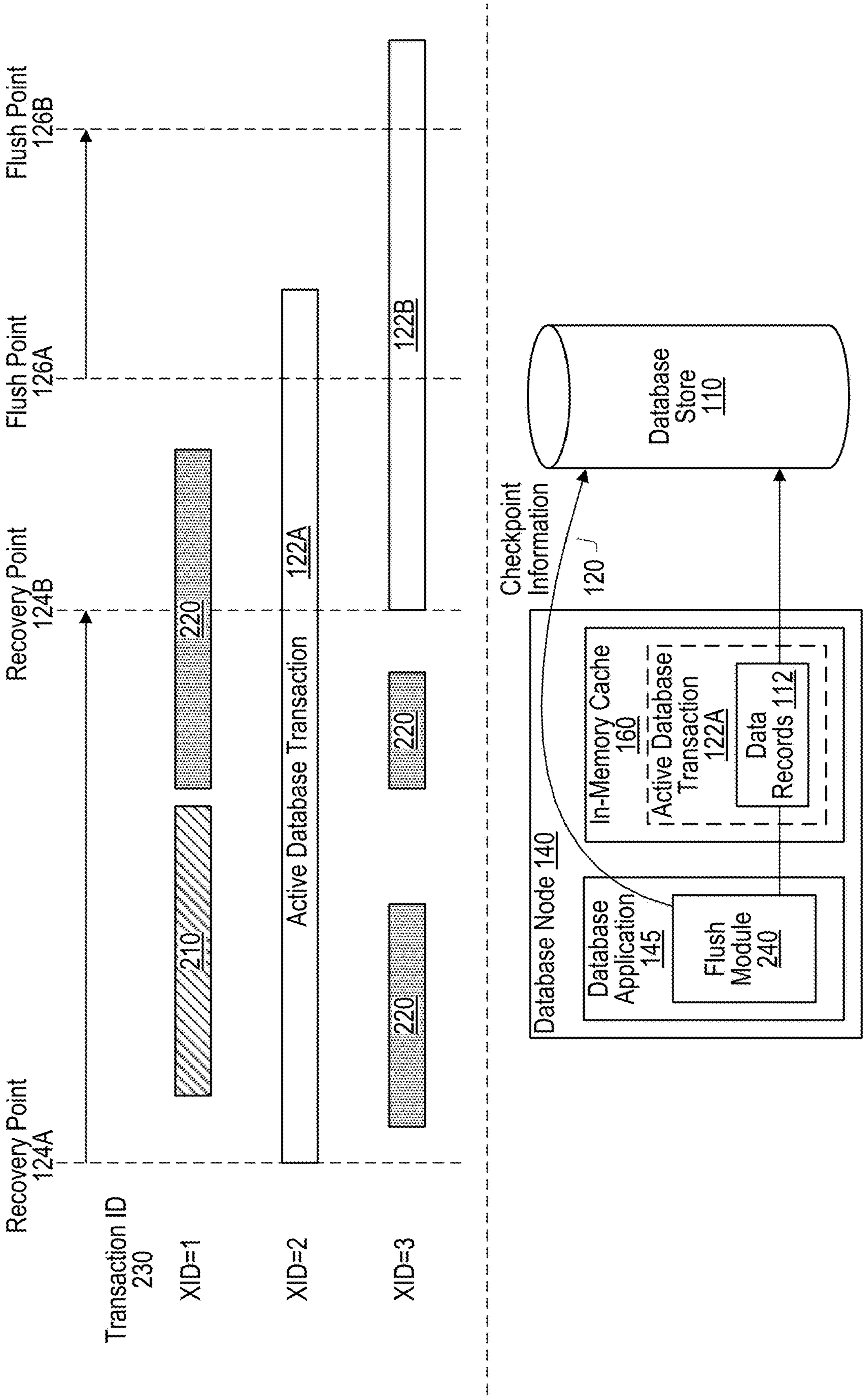
FIG. 2B is a block diagram that illustrates an example update to a recovery point and a flush point as a part of a flush operation, according to some embodiments.

Turning now to FIG. 2B, a block diagram of an example update to a recovery point 124 and a flush point 126 as part of a flush operation is shown. In the illustrated embodiment, there is database store 110 and database node 140 having database application 145 and in-memory cache 160. As further depicted, database application 145 includes a flush module 240, and in-memory cache 160 includes data records 112 for an active database transaction 122A. Also as depicted, there is an aborted database transaction 210, various committed database transactions 220, and active database transactions 122A-B.

Flush module 240, in various embodiments, is software that is executable to perform a flush operation to flush committed data records 112 stored in in-memory cache 160 to database store 110. Flush module 240 can further store updated checkpoint information 120 as a part of that flush operation. As previously mentioned, a flush operation may be performed in response to in-memory cache 160 becoming full or storing enough data records 112 to satisfy a storage threshold. In the illustrated embodiment, an initial flush operation (not shown) is performed at flush point 126A. At flush point 126A, active database transactions 122A is the current oldest active database transaction 122 and thus recovery point 124A is defined based on it, and the data records 112 of active database transaction 122A remain present in in-memory cache 160 after that flush operation. At a future point in time, flush module 240 determines to perform a flush operation that corresponds to flush point 126B. As illustrated, active database transaction 122A has been committed between flush points 126A and 126B. Flush module 240 thus flushes the data records 112 of active database transaction 122A to database store 110 during that flush operation. Active database transaction 122B has become the oldest active database transaction 122 and thus flush module 240, in various embodiments, generates checkpoint information 120 that identifies recovery point 124B and flush point 126B as the new points and does not include active database transaction 122A since it has committed and been flushed. Flush module 240 stores that checkpoint information 120 at database store 110 as shown so that it can be persisted even if database node 140 suffers a database failure.

Figure 3:
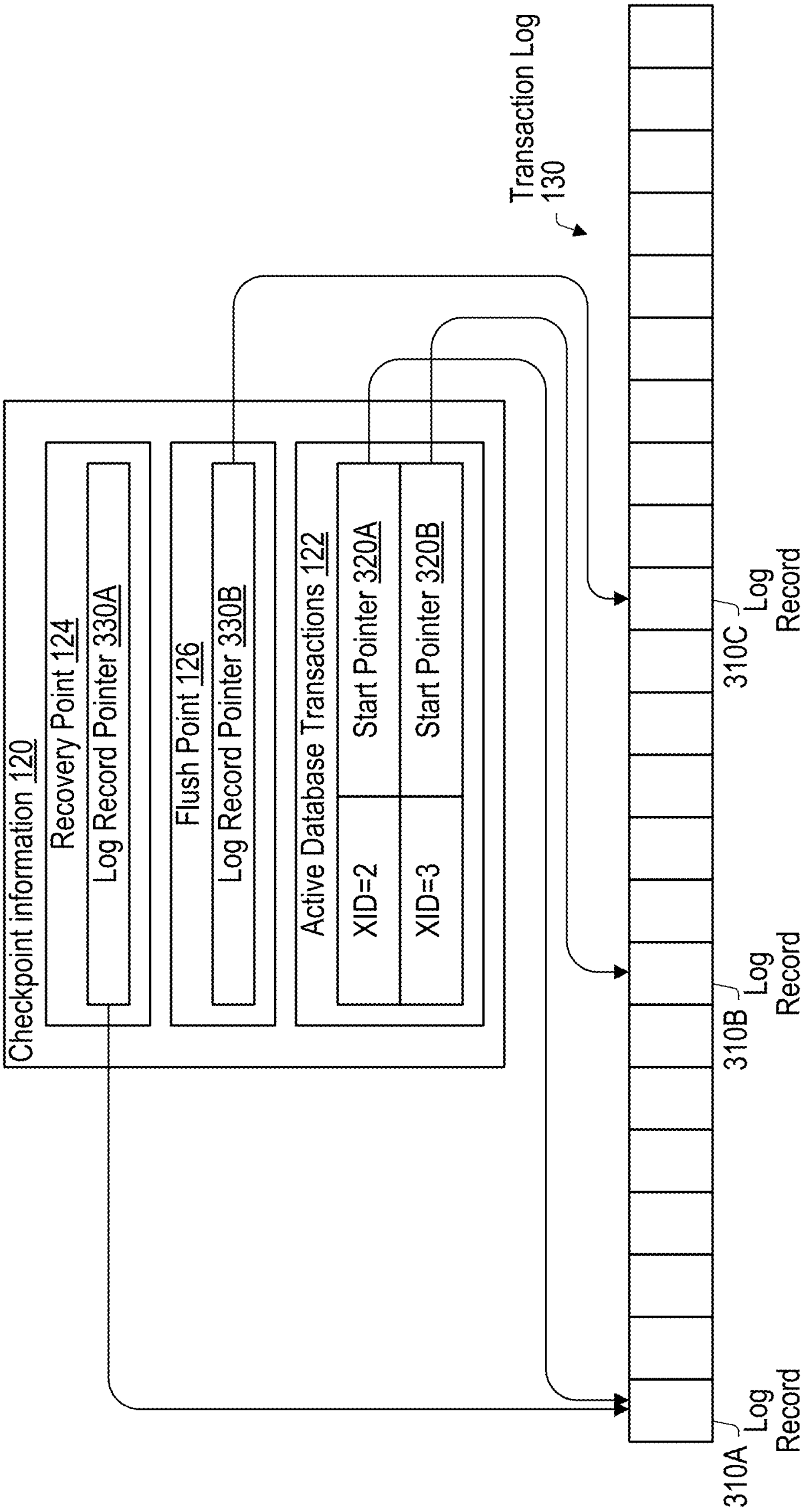
FIG. 3 is a block diagram that illustrates example elements of checkpoint information, according to some embodiments.

Turning now to FIG. 3, a block diagram of example elements of checkpoint information 120 is shown. In the illustrated embodiment, checkpoint information 120 includes a recovery point 124, a flush point 126, and active database transactions 122. As further shown, recovery point 124 comprises a log record pointer 330A, flush point 126 comprises a log record pointer 330B, active database transactions 122 comprise two entries having respective transaction IDs 230 and start pointers 320A-B, respectively. Also as shown, there is transaction log 130 having a series of log records 310 that include log records 310A-C. The illustrated embodiment may be implemented differently than shown. For example, transaction IDs 230 may not be specified for active database transactions 122.

As mentioned, in various embodiments, transaction log 130 comprises log files having log records 310. In some embodiments, those log files are divided into subsections (which can be referred to as "fragments") that each store a set of log records 310. Accordingly, log record pointers 330A-B and start pointers 320A-B, in various embodiments, identify the log file and the fragment within the log file that stores their associated log record 310. Consider an example in which log record 310A is stored in file "1" and fragment "2." Log record pointer 330A and start pointer 320A point to log record 310A and thus specify file "1" and fragment "2." In some embodiments, log record pointers 330A-B and start pointers 320A-B identify the log file only or a unique identifier assigned to their associated log record 310.

In various embodiments, log records 310 of different database transactions may reside in the same log file. Accordingly, log records 310 may be stamped with the transaction ID 230 of the database transaction that wrote them. In order to identify the log records 310 associated with active database transactions 122, checkpoint information 120 specifies the transaction IDs 230 of those active database transactions 122. Accordingly, in various embodiments, database node 140 uses a start pointer 320 to access the relevant log file and fragment and then replays log records 310 that belong to the associated transaction ID 230. As a part of replaying the log records 310, database node 140 may traverse multiple log files according to a temporal order as the log records 310 of a database transaction may be written over a period of time. In some embodiments, a log file includes only log records 310 of a particular database transaction and as a result, checkpoint information 120 may not specify transaction IDs 230 for active database transactions 122.

Because recovery point 124 and the oldest active database transaction 122 point to the same log record 310 in various cases, checkpoint information 120 might not specify recovery point 124. Instead, database node 140 may infer recovery point 124 from start pointers 320 by determining the earliest position in transaction log 130 that is referenced by those start pointers 320 (e.g., determine that log record 310A corresponds to the recovery starting point based on start pointer 320A). Furthermore, in some embodiments, a flush operation may be recorded in transaction log 130 and thus checkpoint information 120 may not specify flush point 126 since database node 140 may traverse log records 310 starting from recovery point 124 until the log record 130 associated with the flush operation is reached—that is, that log record 130 may be used to infer flush point 126.

Figure 4:
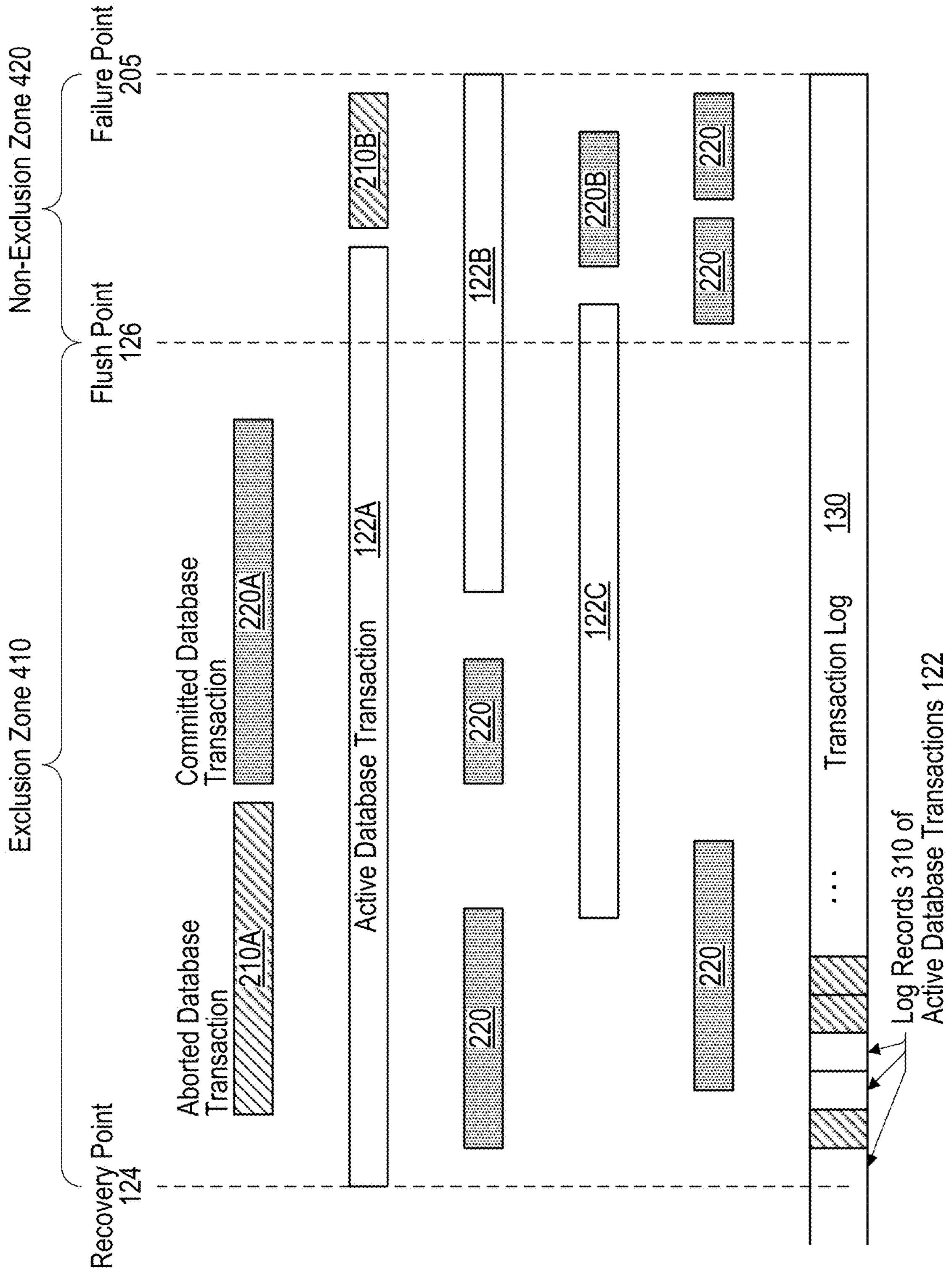
FIG. 4 is a block diagram that illustrates an example exclusion zone and non-exclusion zone relating to a database recovery routine, according to some embodiments.

Turning now to FIG. 4, a block diagram of an exclusion zone and a non-exclusion zone relating to a database recovery routine is shown. Within the illustrated embodiment, there are aborted database transactions 210A-B, several committed database transactions 220, and active database transactions 122A-C. As further shown, there is an exclusion zone 410 that is defined by a recovery point 124 and a flush point 126, and a non-exclusion zone 420 that is defined by flush point 126 and a failure point 128. The illustrated embodiment further includes transaction log 130. The illustrated embodiment may be implemented differently than shown—e.g., flush point 126 may correspond to the end of committed database transaction 220A.

Exclusion zone 410, in various embodiments, represents a zone of database transactions in which database node 140 can exclude replaying committed database transactions 220 and/or aborted database transactions 210. Consequently, non-exclusion zone 420 represents a zone in which database node 140 replays committed database transactions 220 and/or aborted database transactions 210. Accordingly, when performing the database recovery routine, database node 140 may access checkpoint information 120 and use its start pointers 320 to retrieve the initial log records 310 of active database transactions 122A-C. In some instances, database node 140 replays log records 310 of active database transactions 122A-C at least partially in parallel. In particular, database node 140 might spawn a reader process that reads transaction log 130 and pushes the relevant log records 310 into respective queues from which replay processes access those log records 310 and replay them. As an example, the reader process may push log records 310 belonging to active database transaction 122A into a particular queue, and a replay process assigned to that queue and active database transaction 122A replays those log records.

When replaying the log records 310 of a given active database transaction 122, database node 140 may proceed from its initial log record 310 through a series of log records 310 until the last log record 310 of that active database transaction 122 is replayed. In many cases, there may be log records 310 belonging to committed database transactions 220 and aborted database transactions 210 between the initial log record 310 and the last log record 310. Thus, in various embodiments, database node 140 uses the corresponding transaction ID 230 (which is specified in checkpoint information 120) to skip the log records 310 that belong to those other database transactions and to selectively replay those log records 310 that are associated with that active database transaction 122. As shown for example, the "dashed" log records 310 are not replayed while the non-dashed log records 310 are replayed in the illustrated embodiment. Accordingly, within exclusion zone 410, database node 140 may replay only the log records 310 that belong to active database transactions 122. As a result, less than the total number of transactions that occurred between recovery point 124 and flush point 126 are replayed.

After database node 140 has reached flush point 126, in various embodiments, database node 140 starts replaying log records 310 occurring after flush point 126 that belong to aborted database transactions 210 and committed database transactions 220. That is, database node 140 may replay all log records 310 starting from flush point 126 until failure point 205. Thus, while aborted database transaction 210B was aborted before the database failure, its log records 310 are replayed by database node 140. Similarly, while committed database transaction 220B was committed before the database failure occurred, its log records 310 are also replayed. Database node 140 further replays the log records 310 of active database transactions 122 that occurred within the non-exclusion zone 420. Upon reaching failure point 205, in various embodiments, database node 140 resumes normal database operations.

Figure 5:
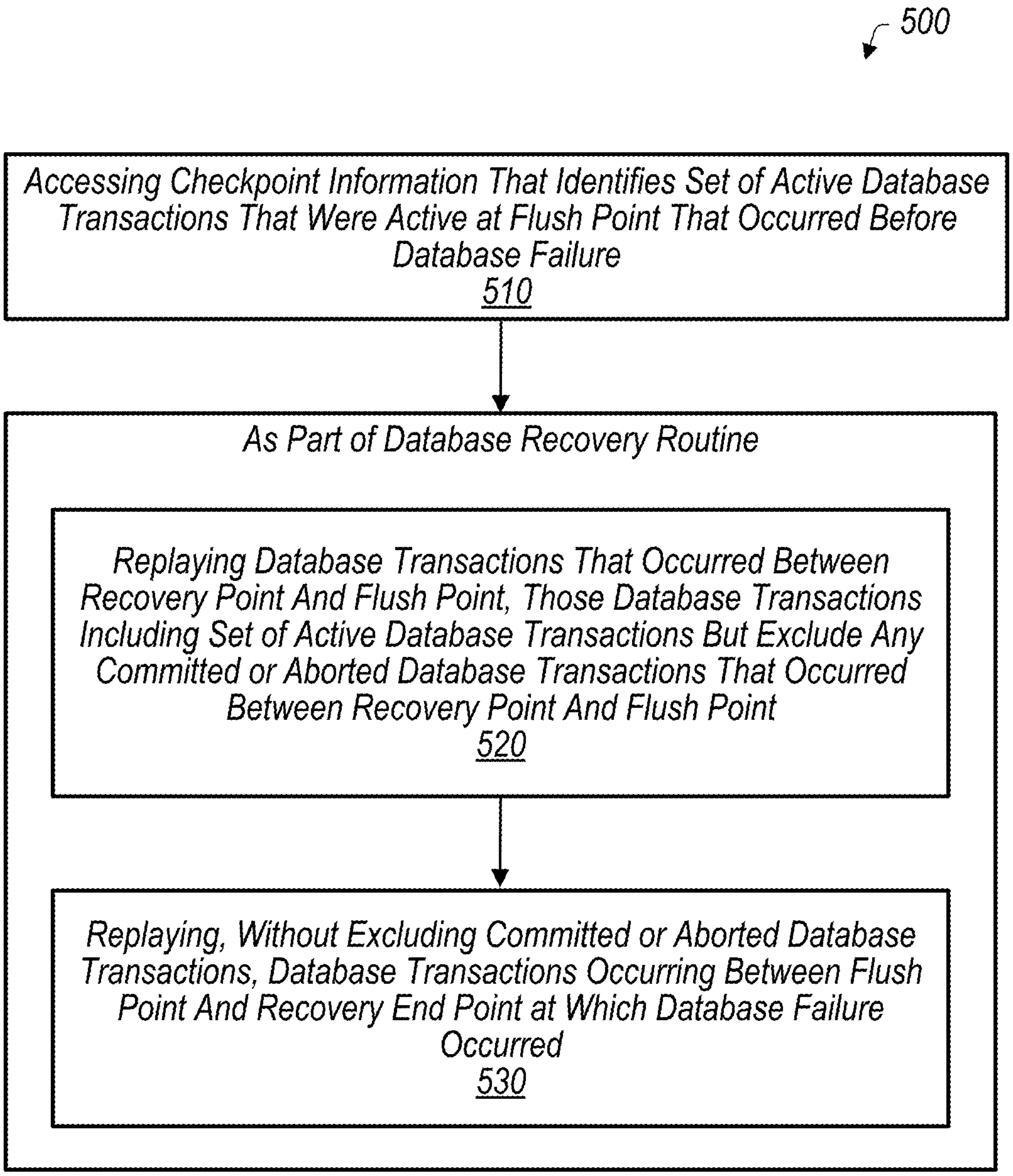
FIG. 5 is a flow diagram illustrating an example method relating to a database recovery routine, according to some embodiments.

Turning now to FIG. 5, a flow diagram of a method 500 is depicted. Method 500 is one embodiment of a method performed by a database system (e.g., system 100) for implementing a database recovery routine to start up in response to a database failure (e.g., a crash). Method 500 can be performed by executing program instructions stored on a non-transitory computer-readable medium. Method 500 can include more or less steps than shown. For example, method 500 might not include step 530.

Method 500 begins in step 510 with the database system accessing checkpoint information (e.g., checkpoint information 120) that identifies a set of active database transactions (e.g., active database transactions 122) that were active at a flush point (e.g., flush point 126) that occurred before the database failure. In various embodiments, the flush point corresponds to an execution of a flush operation in which records (e.g., records 112) of at least one committed database transaction were flushed to a database repository (e.g., database store 110). The checkpoint information may identify, for a particular one of the set of active database transactions, a transaction identifier (e.g., a transaction ID 230) that is associated with one or more log records (e.g., log records 310) of a transaction log (e.g., a transaction log 130) that is used in the replaying of the database transactions that occurred between a recovery point (e.g., recovery point 124) and the flush point. The checkpoint information may also specify a starting log position (e.g., a start pointer 320) that corresponds to an initial log record written to the transaction log for the particular active database transaction. The starting log position is after any log records written for committed database transactions associated with the same transaction identifier. In some cases, the starting log position may reference a fragment of a log file that includes a log record of an aborted database transaction (with the same transaction identifier as an active database transaction) that occurs before the initial log record of the active database transaction. Thus, the starting log may be before an aborted database transaction with the same transaction identifier. The checkpoint information may also specify the recovery point and the flush point. The recovery point may correspond to an initial log record that was written to the transaction log for the oldest one of the set of active database transactions. In various embodiments, the checkpoint information is accessed from the database repository that stores the committed records of database transactions that were committed by the database system.

In step 520, as part of the database recovery routine, the database system replays database transactions that occurred between the recovery point and the flush point. The database transactions include the set of active database transactions but exclude any committed or aborted database transactions that occurred between the recovery point and the flush point such that less than a total number of database transactions occurring between the recovery point and the flush point are replayed. In some embodiments, a particular point corresponding to a most recently committed database transaction whose commit occurred before the flush operation that occurred before the database failure is used instead of the flush point. In various embodiments, the replaying of the database transactions that occurred between the recovery point and the flush point includes accessing a portion of the transaction log, where the portion includes a plurality of log records that were written between the recovery point and the flush point. A given log record identifies a set of database operations performed as part of executing a database transaction. The database system replays the database operations of a subset of the plurality of log records that corresponds to the set of active database transactions.

In step 530, as part of the database recovery routine, the database system replays, without excluding committed or aborted database transactions, database transactions occurring between the flush point and a recovery end point (e.g., failure point 205) at which the database failure occurred. The recovery end point may correspond to an end of the transaction log. In various embodiments, replaying the database transactions that occurred between the recovery point and the flush point and the database transactions that occurred between the flush point and the recovery end point includes inserting records of those transactions into an in-memory cache (e.g., in-memory cache 160) of the database system to recreate a state of the in-memory cache that existed when the database failure occurred. Subsequent to implementing the database recovery routine, the database system may commit the oldest active database transaction, perform a flush operation to flush records of the oldest active database transaction to the database repository, and update the recovery point to correspond to the next oldest still active database transaction.

Exemplary Computer System

Figure 6:
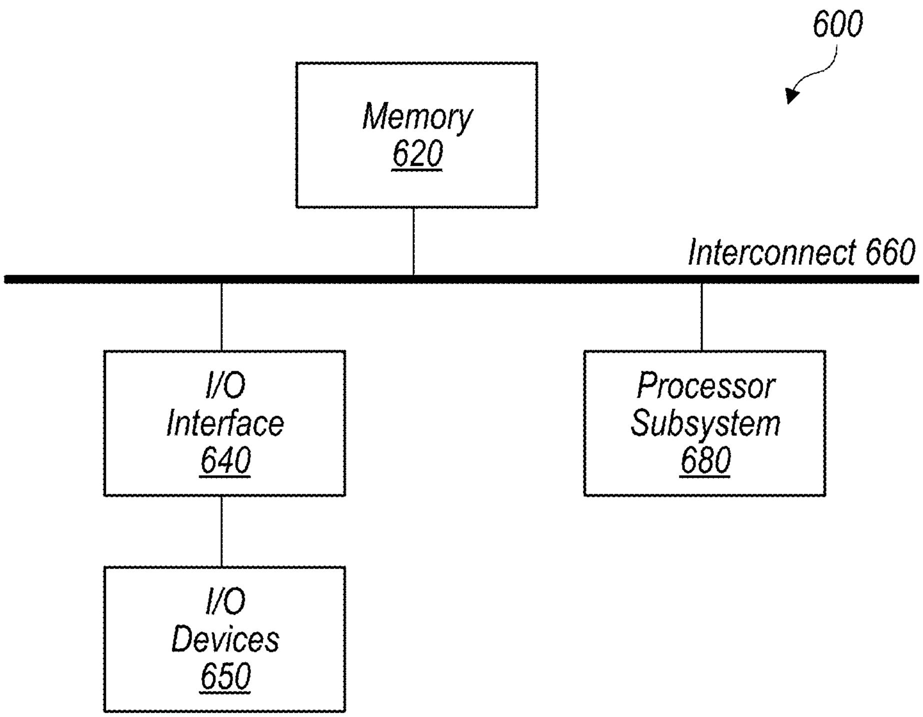
FIG. 6 is a block diagram illustrating elements of a computer system for implementing various systems described in the present disclosure, according to some embodiments.

Turning now to FIG. 6, a block diagram of an exemplary computer system 600, which may implement system 100, database store 110, or database node 140, is depicted. Computer system 600 includes a processor subsystem 680 that is coupled to a system memory 620 and I/O interfaces(s) 640 via an interconnect 660 (e.g., a system bus). I/O interface(s) 640 is coupled to one or more I/O devices 650. Although a single computer system 600 is shown in FIG. 6 for convenience, system 600 may also be implemented as two or more computer systems operating together.

Processor subsystem 680 may include one or more processors or processing units. In various embodiments of computer system 600, multiple instances of processor subsystem 680 may be coupled to interconnect 660. In various embodiments, processor subsystem 680 (or each processor unit within 680) may contain a cache or other form of on-board memory.

System memory 620 is usable store program instructions executable by processor subsystem 680 to cause system 600 perform various operations described herein. System memory 620 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 600 is not limited to primary storage such as memory 620. Rather, computer system 600 may also include other forms of storage such as cache memory in processor subsystem 680 and secondary storage on I/O Devices 650 (e.g., a hard drive, storage array, etc.). In some embodiments, these other forms of storage may also store program instructions executable by processor subsystem 680. In some embodiments, program instructions that when executed implement database application 145, database recovery module 150, in-memory cache 160, and/or flush module 240 may be included/stored within system memory 620.

I/O interfaces 640 may be any of various types of interfaces configured to couple to and communicate with other devices, according to various embodiments. In one embodiment, I/O interface 640 is a bridge chip (e.g., Southbridge) from a front-side to one or more back-side buses. I/O interfaces 640 may be coupled to one or more I/O devices 650 via one or more corresponding buses or other interfaces. Examples of I/O devices 650 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device 650 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to"

perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

executing, by a database system, a plurality of database transactions, wherein the executing includes writing records for the plurality of database transactions into an in-memory cache of the database system;

performing, by the database system, a first flush operation to flush committed records from the in-memory cache to a persistent storage, wherein the committed records correspond to one or more of the plurality of database transactions that have committed; and based on the performing of the first flush operation, generating, by the database system, checkpoint information for use in a database recovery routine, wherein the checkpoint information identifies active database transactions of the plurality of database transactions that were active and not committed at a flush point associated with the first flush operation, and wherein the checkpoint information enables the database system to skip replaying, during the database recovery routine, committed or aborted database transactions of the plurality of database transactions that occurred between a recovery start point of the database recovery routine and the flush point such that less than a total number of the plurality of database transactions is replayed, wherein the recovery start point is before the flush point.

2. The method of claim 1, wherein the executing includes writing log records for the plurality of database transactions to a transaction log, and wherein the checkpoint information specifies, for a particular one of the active database transactions, a transaction identifier associated with one or more log records of the transaction log that enable the particular active database transaction to be replayed.

3. The method of claim 2, wherein the checkpoint information specifies a starting log position corresponding to an initial log record written to the transaction log for the particular active database transaction.

4. The method of claim 2, wherein the recovery start point corresponds to an initial log record written to the transaction log for the oldest one of the active database transactions.

5. The method of claim 2, wherein the flush point corresponds to a position in the transaction log that is associated with the first flush operation.

6. The method of claim 2, wherein the checkpoint information specifies the flush point and the recovery start point, wherein a recovery end point of the database recovery routine corresponds to an end of the transaction log.

7. The method of claim 1, further comprising:

performing, by the database system, a second flush operation to flush, from the in-memory cache to the persistent storage, records committed since the first flush operation; and updating, by the database system, the checkpoint information to remove ones of the active database transactions that committed since the first flush operation.

8. The method of claim 1, further comprising:

performing, by the database system, the database recovery routine, wherein the performing of the database recovery routine includes:

accessing the checkpoint information;

replaying, based on the checkpoint information, the active database transactions but excluding any committed or aborted database transactions that occurred between the recovery start point and the flush point; and replaying, without excluding committed or aborted database transactions, database transactions occurring between the flush point and a recovery end point of the database recovery routine.

9. A non-transitory computer-readable medium having program instructions stored thereon that are capable of causing a computer system to perform operations comprising:

executing a plurality of database transactions, wherein the executing includes writing records for the plurality of database transactions into an in-memory cache of the computer system;

performing a first flush operation to flush committed records from the in-memory cache to a persistent storage, wherein the committed records correspond to one or more of the plurality of database transactions that have committed; and based on the performing of the first flush operation, generating checkpoint information for use in a database recovery routine, wherein the checkpoint information identifies active database transactions of the plurality of database transactions that were active and not committed at a flush point associated with the first flush operation, and wherein the checkpoint information enables a database system to skip replaying, during the database recovery routine, committed or aborted database transactions of the plurality of database transactions that occurred between a recovery start point of the database recovery routine and the flush point such that less than a total number of the plurality of database transactions is replayed, wherein the recovery start point is before the flush point.

10. The non-transitory computer-readable medium of claim 9, wherein the operations further comprise:

writing log records for the plurality of database transactions to a transaction log, wherein the recovery start point corresponds to an initial log record written to the transaction log for the oldest one of the active database transactions.

11. The non-transitory computer-readable medium of claim 10, wherein the operations further comprise:

committing the oldest active database transaction;

performing a second flush operation to flush, from the in-memory cache to the persistent storage, committed records of the oldest active database transaction; and updating the recovery start point to correspond to another active database transaction.

12. The non-transitory computer-readable medium of claim 9, wherein the checkpoint information specifies, for a given one of the active database transactions:

a transaction identifier of the given active database transaction that is associated with one or more log records of a transaction log; and a starting log position corresponding to an initial log record written to the transaction log for the given active database transaction.

13. The non-transitory computer-readable medium of claim 9, wherein the operations further comprise:

performing a second flush operation to flush, from the in-memory cache to the persistent storage, records committed since the first flush operation; and updating the checkpoint information to remove ones of the active database transactions that committed since the first flush operation.

14. The non-transitory computer-readable medium of claim 9, wherein the operations further comprise:

performing the database recovery routine, wherein the performing of the database recovery routine includes:

accessing the checkpoint information; and replaying, based on the checkpoint information, the active database transactions but excluding any committed or aborted database transactions that occurred between the recovery start point and the flush point.

15. A system, comprising:

at least one processor, and a memory having program instructions stored thereon that are executable by the at least one processor to cause the system to perform operations comprising:

executing a plurality of database transactions, wherein the executing includes writing records for the plurality of database transactions into an in-memory cache of the system;

performing a first flush operation to flush committed records from the in-memory cache to a persistent storage, wherein the committed records correspond to one or more of the plurality of database transactions that have committed; and based on the performing of the first flush operation, generating checkpoint information for use in a database recovery routine, wherein the checkpoint information identifies active database transactions of the plurality of database transactions that were active and not committed at a flush point associated with the first flush operation, and wherein the checkpoint information enables the system to skip replaying, during the database recovery routine, committed or aborted database transactions of the plurality of database transactions that occurred between a recovery start point of the database recovery routine and the flush point such that less than a total number of the plurality of database transactions is replayed, wherein the recovery start point is before the flush point.

16. The system of claim 15, wherein the operations further comprise:

writing log records for the plurality of database transactions to a transaction log, wherein the checkpoint information specifies the recovery start point, and wherein the recovery start point corresponds to an initial log record written to the transaction log for the oldest one of the active database transactions.

17. The system of claim 16, wherein the checkpoint information specifies, for a given one of the active database transactions, a transaction identifier and a starting log position that corresponds to an initial log record written to the transaction log for that given active database transaction.

18. The system of claim 16, wherein the checkpoint information specifies the flush point, and wherein the flush point corresponds to a log record of the transaction log that is associated with the first flush operation.

19. The system of claim 16, wherein the checkpoint information specifies the flush point, and wherein the operations further comprise:

committing the oldest active database transaction;

performing a second flush operation to flush, from the in-memory cache to the persistent storage, additional committed records corresponding to a set of transactions that includes the oldest active database transaction; and updating the recovery start point to correspond to a next oldest active database transaction and the flush point to correspond to a log record of the transaction log that is associated with the second flush operation.

20. The system of claim 15, wherein the operations further comprise:

performing the database recovery routine, wherein the performing of the database recovery routine includes:

accessing the checkpoint information; and replaying, based on the checkpoint information, the active database transactions but excluding any committed or aborted database transactions that occurred between the recovery start point and the flush point.

* * * * *